United States Patent
Hajir et al.

(10) Patent No.: US 11,855,720 B2
(45) Date of Patent: Dec. 26, 2023

(54) METHOD AND APPARATUS FOR NORMALIZATION OF SOFTBITS BASED ON CHANNEL CHARACTERISTICS

(71) Applicant: Samsung Electronics Co., Ltd., Suwon-si (KR)

(72) Inventors: Mouna Hajir, San Diego, CA (US); Mojtaba Rahmati, San Diego, CA (US); Hyukjoon Kwon, San Diego, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/840,581

(22) Filed: Jun. 14, 2022

(65) Prior Publication Data

US 2023/0308148 A1 Sep. 28, 2023

Related U.S. Application Data

(60) Provisional application No. 63/324,634, filed on Mar. 28, 2022.

(51) Int. Cl.
| | |
|---|---|
| H04B 7/0456 | (2017.01) |
| H04B 7/01 | (2006.01) |
| H04L 27/26 | (2006.01) |
| H04B 17/336 | (2015.01) |
| H04L 1/00 | (2006.01) |

(52) U.S. Cl.
CPC .......... *H04B 7/0486* (2013.01); *H04B 7/01* (2013.01); *H04B 17/336* (2015.01); *H04L 1/0003* (2013.01); *H04L 27/2605* (2013.01)

(58) Field of Classification Search
None
See application file for complete search history.

(56) References Cited

U.S. PATENT DOCUMENTS

| | | | |
|---|---|---|---|
| 6,876,709 B1 | 4/2005 | Kim et al. | |
| 7,978,793 B2 | 7/2011 | Anekoji | |
| 8,223,868 B2 | 7/2012 | Lee | |
| 8,767,889 B2 | 7/2014 | Roh | |

(Continued)

*Primary Examiner* — Minh Trang T Nguyen
(74) *Attorney, Agent, or Firm* — Renaissance IP Law Group LLP

(57) ABSTRACT

A system and a method are disclosed for normalizing Log-Likelihood Ratios for bits of a transport block. For a narrowband channel estimation (NBCE), a normalization factor is selected based on an estimated delay spread, a cyclic prefix, an estimated Doppler spread, a rank, a modulation and coding scheme (MCS) and a signal-to-noise ratio (SNR) for the transport block, and an input $LLR_{in}$ for the individual bits of the transport block are scaled to respectively form an output $LLR_{out}$ for the individual bits of the transport block using the normalization factor. For a wideband channel estimation, a normalization factor is selected based on the rank/MCS/SNR of the transport block, and the input $LLR_{in}$ for the individual bits of the transport block are scaled to respectively form the output $LLR_{out}$ for the individual bits of the transport block using the normalization factor.

18 Claims, 3 Drawing Sheets

(56) References Cited

U.S. PATENT DOCUMENTS

| | | | |
|---|---|---|---|
| 8,806,289 B1 | 8/2014 | Yeo et al. | |
| 8,867,445 B2 * | 10/2014 | Åhlander | H04L 25/03006 370/328 |
| 8,867,673 B2 | 10/2014 | Wilborn et al. | |
| 2013/0051444 A1 * | 2/2013 | Roh | H03M 13/6591 714/780 |

* cited by examiner

METHOD AND APPARATUS FOR NORMALIZATION OF SOFTBITS BASED ON CHANNEL CHARACTERISTICS

CROSS-REFERENCE TO RELATED APPLICATION

This application claims the priority benefit under 35 U.S.C. § 119(e) of U.S. Provisional Application No. 63/324,634, filed on Mar. 28, 2022, the disclosure of which is incorporated herein by reference in its entirety.

TECHNICAL FIELD

The subject matter disclosed herein relates to wireless communications. More particularly, the subject matter disclosed herein relates to a system and method that provides normalization of softbits based on transmission block parameters and channel characteristics.

BACKGROUND

The legacy Log-Likelihood Ratio (LLR) quantization strategy designed for Long-Term Evolution (LTE), which is based on Rank level/Modulation Coding Scheme/SNR level (Rank/MCS/SNR), may be insufficient to cover all possible scenarios in New Radio (NR). The NR new numerologies and the NR channel estimation structure significantly impacts the detector LLR distributions, which may vary depending on channel estimation (CE) mode: Narrow-Band CE (NBCE) versus Wideband CE (WBCE). For NBCE, channel characteristics, such as delay and Doppler spread, further impact the quantization method. Selection of quantization methods may also be based on a number of channel characteristics, such as Rank level, MCS, SNR level, estimated Doppler spread, estimated Delay spread, subcarrier spacing, and channel estimation type (Narrow band CE or Wideband CE).

SUMMARY

An example embodiment provides a method for normalizing LLRs for bits of a transport block in which the method may include: receiving, by a User Equipment (UE), the transport block over a channel of a wireless network; selecting, by the UE, a normalization factor q based, at least in part, on a narrowband channel estimation being used; and scaling, by the UE, an input $LLR_{in}$ for individual bits of the transport block to respectively form an output $LLR_{out}$ for the individual bits of the transport block by multiplying a corresponding input $LLR_{in}$ for the individual bits by $2^q$. In one embodiment, the normalization factor q may be selected further based on, at least in part, one of an estimated delay spread for the transport block, a cyclic prefix for the transport block, an estimated Doppler spread for the transport block, or a combination thereof. In another embodiment, selecting the normalization factor q may be further based, at least in part, on one of the estimated delay spread of the transport block being greater than a first predetermined threshold, the estimated delay spread divided by the cyclic prefix of the transport block being greater than a second predetermined threshold and the estimated Doppler spread of the transport block being greater than a third predetermined threshold, or a combination thereof. In still another embodiment, the normalization factor q may be further based, at least in part, on one of the estimated delay spread of the transport block being greater than a first predetermined threshold, and the estimated delay spread divided by the cyclic prefix of the transport block being less than a second predetermined threshold, or a combination thereof. In yet another embodiment, selecting the normalization factor q may be further based, at least in part, on one of the estimated delay spread of the transport block being less than a first predetermined threshold, the estimated delay spread divided by the cyclic prefix of the transport block being greater than a second predetermined threshold, and the estimated Doppler spread of the transport block being greater than a third predetermined threshold, or a combination thereof. In one embodiment, selecting the normalization factor q may be further based, at least in part, on one of the estimated delay spread of the transport block being less than a first predetermined threshold, and the estimated delay spread divided by the cyclic prefix of the transport block being less than a second predetermined threshold, or a combination thereof.

An example embodiment provides a method for normalizing LLRs for bits of a transport block in which the method may include: receiving, by a UE, the transport block over a channel of a wireless network; selecting, by the UE, a normalization factor q based, at least in part, on a wideband channel estimation being used; and scaling, by the UE, an input $LLR_{in}$ for individual bits of the transport block to respectively form an output $LLR_{out}$ for the individual bits of the transport block by multiplying a corresponding input $LLR_{in}$ for the individual bits by $2^q$. In one embodiment, the normalization factor q may be selected further based, at least in part, on one of a rank of associated with the transport block, a modulation and coding scheme of the transport block, a signal-to-noise ratio associated with the transport block, or a combination thereof. In another embodiment, scaling the input $LLR_{in}$ for individual bits of the transport block may further include multiplying an absolute value of the corresponding $LLR_{in}$ for the individual bits by $2^q$ An example embodiment provides a method for normalizing LLRs for bits of a transport block in which the method may include: receiving, by a UE, the transport block over a channel of a wireless network; determining, by the UE, an input $LLR_{in}$ for individual bits of the transport block; and respectively scaling, by the UE, a corresponding input $LLR_{in}$ for the individual bits of the transport block using a normalizing factor that may be based, at least in part, on a narrowband channel estimation being used for estimating the channel. In one embodiment, the normalizing factor may be further based, at least in part, on one of an estimated delay spread of the transport block being greater than a first predetermined threshold, the estimated delay spread divided by a cyclic prefix of the transport block being greater than a second predetermined threshold and an estimated Doppler spread of the transport block being greater than a third predetermined threshold, or a combination thereof. In another embodiment, the normalizing factor may be further based, at least in part, on one of an estimated delay spread of the transport block being greater than a first predetermined threshold, and the estimated delay spread divided by a cyclic prefix of the transport block being less than or equal to a second predetermined threshold, or a combination thereof. In still another embodiment, the normalizing factor may be further based, at least in part, on one of an estimated delay spread of the transport block being less than or equal to a first predetermined threshold, the estimated delay spread divided by a cyclic prefix of the transport block being greater than a fourth predetermined threshold, and an estimated Doppler spread of the transport block being greater than a fifth predetermined threshold, or a combination thereof. In yet another embodiment, the normalizing factor may be further based, at least in part, on one of an estimated delay spread of the transport block being less than or equal to a first predetermined threshold, and the estimated delay spread divided by a cyclic prefix of the transport block being less than or equal to a fifth predetermined threshold, or a combination thereof. In one embodiment, the normalizing factor may be further based, at least in part, on an estimated Doppler spread of the transport block being less than or equal to a fifth predetermined threshold.

An example embodiment provides a method for normalizing LLRs for bits of a transport block in which the method may include: receiving, by a UE, the transport block over a channel of a wireless network; determining, by the UE, an input $LLR_{in}$ for individual bits of the transport block; and respectively scaling, by the UE, a corresponding input $LLR_{in}$ for the individual bits of the transport block using a normalizing factor that may be based, at least in part, on a wideband channel estimation being used for estimating the channel. In one embodiment, the input $LLR_{in}$ for individual bits of the transport block may be respectively scaled to form an output $LLR_{out}$ for the individual bits of the transport block by multiplying the corresponding input $LLR_{in}$ for the individual bits by 2 to a power of the normalizing factor. In another embodiment, scaling the input $LLR_{in}$ for individual bits of the transport block may further include multiplying an absolute value of the corresponding $LLR_{in}$ for the individual bits by 2 to the power of the normalizing factor.

An example embodiment provides a device that may include a receiver and a processor. The receiver may be configured to receive a transport block over a channel of a wireless network. The processor may be coupled to the receiver, and the processor may be configured to normalize LLRs for bits of the transport block by: selecting a normalizing factor q based, at least in part, on a narrowband channel estimation being used, and one of an estimated delay spread for the transport block, a cyclic prefix for the transport block, an estimated Doppler spread for the transport block, or a combination thereof, and scaling an input $LLR_{in}$ for individual bits of the transport block to respectively form an output $LLR_{out}$ for the individual bits of the transport block by multiplying a corresponding input $LLR_{in}$ for the individual bits by $2^q$. In one embodiment, the processor may be further configured to scale the input $LLR_{in}$ for individual bits of the transport block by multiplying an absolute value of the corresponding input $LLR_{in}$ for the individual bits by $2^q$, and the normalizing factor q may be further based, at least in part, on a rank of associated with the transport block, a modulation and coding scheme of the transport block, a signal-to-noise ratio associated with the transport block, or a combination thereof. In another embodiment, the processor may be further configured to select the normalizing factor q further based, at least in part, on one of the estimated delay spread of the transport block being greater than a first predetermined threshold, the estimated delay spread divided by the cyclic prefix of the transport block being greater than a second predetermined threshold and the estimated Doppler spread of the transport block being greater than a third predetermined threshold, or a combination thereof. In still another embodiment, the processor may be further configured to select the normalizing factor q based, at least in part, on one of the estimated delay spread of the transport block being greater than a first predetermined threshold, and the estimated delay spread divided by the cyclic prefix of the transport block being less than a second predetermined threshold, or a combination thereof. In yet another embodiment, the processor may be further configured to select the normalizing factor q based, at least in part, on one of the estimated delay spread of the transport block being less than a first predetermined threshold, the estimated delay spread divided by the cyclic prefix of the transport block being greater than a second predetermined threshold, and the estimated Doppler spread of the transport block being greater than a third predetermined threshold, or a combination thereof. In one embodiment, the processor may be further configured to select the normalizing factor q based, at least in part, on one of the estimated delay spread of the transport block being less than a first predetermined threshold, and the estimated delay spread divided by the cyclic prefix of the transport block being less than a second predetermined threshold, or a combination thereof.

An example embodiment provides a device that includes a receiver and a processor. The receiver may be configured to receive a transport block over a channel of a wireless network. The processor may be coupled to the receiver, and the processor may be configured to normalize LLRs for bits of the transport block by: selecting a normalizing factor q based on a wideband channel estimation being used, and scaling an input $LLR_{in}$ for individual bits of the transport block to respectively form an output $LLR_{out}$ for the individual bits of the transport block by multiplying a corresponding input $LLR_{in}$ for the individual bits by $2^q$. In one embodiment, the normalizing factor q may be further based, at least in part, on a rank of associated with the transport block, a modulation and coding scheme of the transport block, a signal-to-noise ratio associated with the transport block, or a combination thereof. In another embodiment, the processor may be further configured to scale the input $LLR_{in}$ for individual bits of the transport block by multiplying an absolute value of the corresponding input $LLR_{in}$ for the individual bits by $2^q$.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
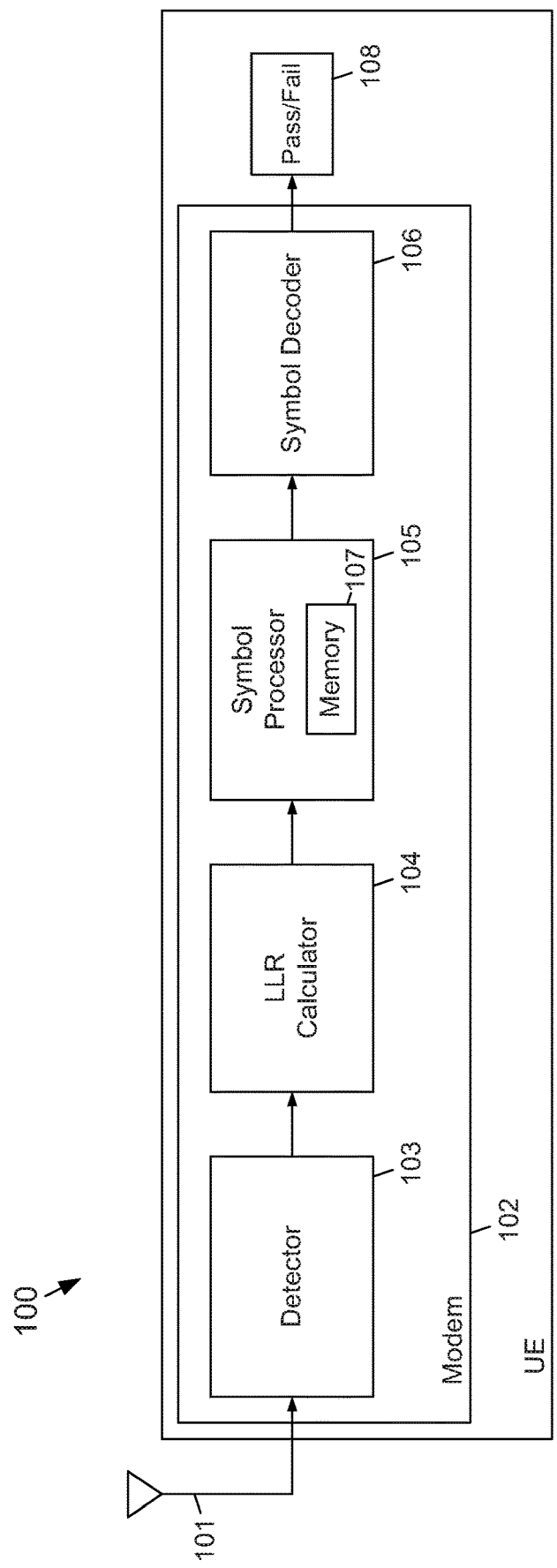
FIG. 1 depicts a block diagram of a user equipment that determines a normalization factor q according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific,"etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to"another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a system and a method for normalization of softbits based on transmission block parameters and channel characteristics. In one embodiment, the subject matter disclosed herein provides a normalization method based on a combination channel estimation (NBCE or WBCE), delay spread, cyclic prefix length, Doppler spread, Rank level, MCS, SINR (Signal to Interference and Noise Ratio), and numerology that provides a decoding gain and a Block Error Rate (BLER) enhancement in NR.

In any practical soft-decision decoding, the LLRs determined by a demodulator are quantized before being input to a decoder. A normalizing factor q represents the number of fractional bits in the quantized demodulated LLRs in which selection of q determines the effective quantization level. An effective LLR quantization scheme (i.e., a q selection technique) for new radio (NR) systems is disclosed herein in which a q value is adaptively selected as a function of measurements and configurations, such as, but not limited to, modulation order, rank, SINR, Delay spread, Doppler spread, cyclic prefix length, and subcarrier spacing (SCS).

FIG. 1 depicts a block diagram of a user equipment (UE) 100 that determines a normalization factor q according to the subject matter disclosed herein. The UE 100 includes an antenna 101 and a modem 102. The UE 100 may also include other components and/or modules that are not shown in FIG. 1. In one embodiment, the antenna 101 may be a Multiple-In, Multiple-Output (MIMO) antenna. The antenna 101 may receive wireless communications, such as one or more transport blocks, over a wireless channel (not indicated), and the received communications may be input to the modem 102.

The modem 102 may include a detector circuit 103, a LLR calculator circuit 104, a symbol processor circuit 105, and a symbol decoder circuit 106. The detector circuit 103 detects the received communications (i.e., the one or more transport blocks) as affected by the wireless channel and noise. The LLR calculator circuit 104 calculates, or determines, a $llr_{in}$ value for each bit of a transport block. In one embodiment, the $llr_{in}$ values for the each of the bits of the transport block in a memory 107 of the symbol processor circuit 105. The symbol processor circuit 105 determines, or selects, a normalization factor q, as described herein. The normalization factor q is used by the symbol processing circuit to scale the $llr_{in}$ values to form a $llr_{out}$ value for each respective bit of the transport block. The $llr_{out}$ values are input to the symbol decoder circuit 106, which decodes the bits of the transport block to form the transmitted message and outputs an indication at 108 whether the transmission passed or failed. Although the functionality described for FIG. 1 has been described as being performed by the modem 102, it should be understood that some or all of the functionality may be performed by other components and/or modules that are not depicted in FIG. 1.

Let $llr_{in}$ denote the value corresponding to the LLR for a single bit contained in one transport block (TB) after MIMO detection, and let $llr_{out}$ denote an M-bit quantized version of a corresponding $llr_{in}$ that is input to the decoder circuit 106. A normalization factor q may be dynamically assigned per transport block that may be used for selecting M bits of an initial set of bits representing $llr_{in}$. That is, the normalization factor q may be used for optionally scaling $llr_{in}$. The normalization factor q represents the number of fractional bits out of M bits in $llr_{out}$ as:

$$llr_{out} = sign(llr_{in}) \times min(|llr_{in}| \times 2^q, 2^M). \quad (1)$$

Selection of a value q may be based on a combination of the following criteria, which include, but are not limited to, channel estimation type (narrow band CE or wideband CE), cyclic prefix length, estimated delay spread, estimated Doppler spread, subcarrier spacing, rank level and SINR level.

Figure 2:
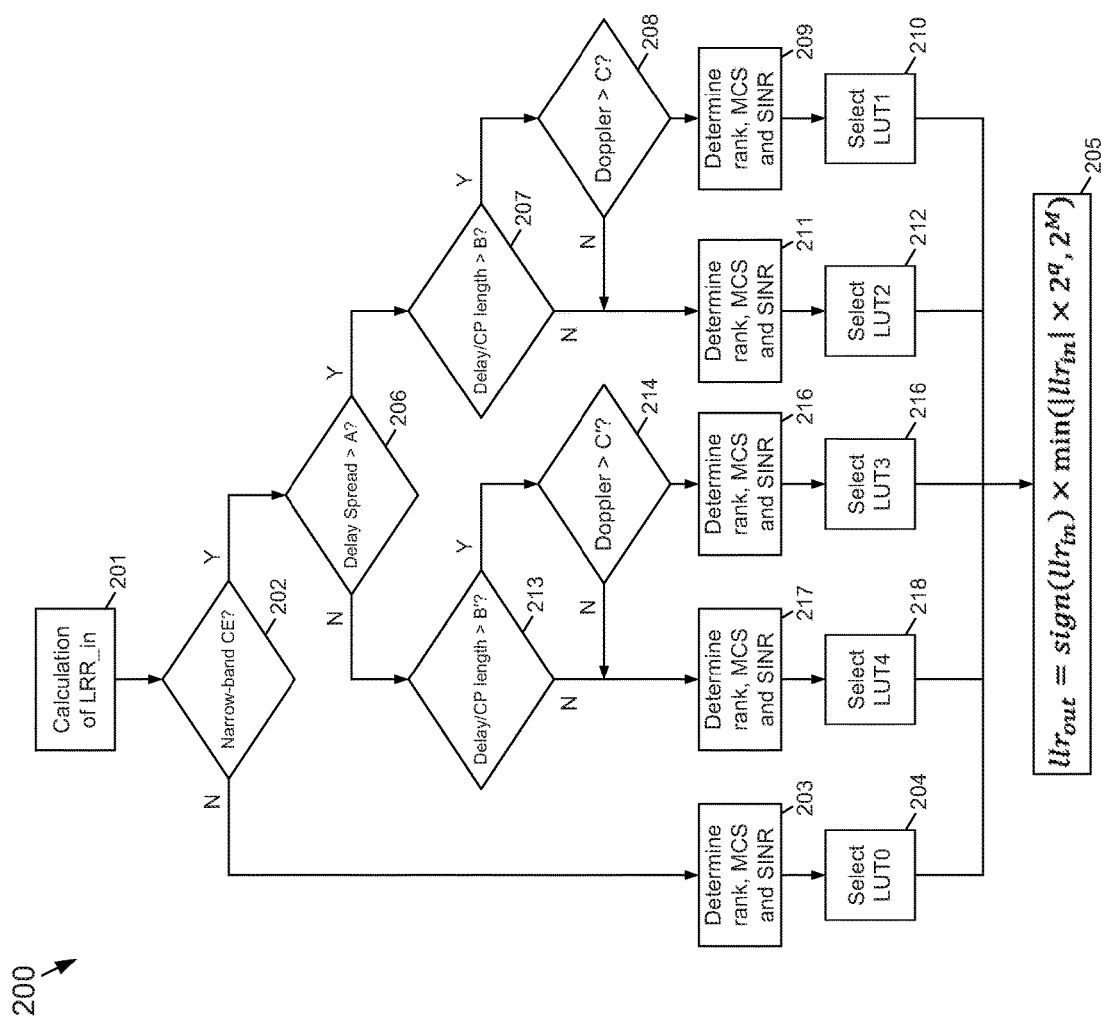
FIG. 2 is a flowchart of an example embodiment of a sequence, or a method, for evaluating criteria for determining a normalization factor q for Rank2 256 QAM according to the subject matter disclosed herein.

In one embodiment, criterion evaluation for determining a normalization factor q may follow a sequence before the factor q is selected from, for example, a look-up table (LUT) before be applied successively to the $llr_{in}$ values. FIG. 2 is a flowchart of an example embodiment of a sequence or a method 200 for evaluating criteria for determining a normalization factor q for Rank2 256 QAM according to the subject matter disclosed herein. Evaluating criteria for determined a normalization factor 1 for other ranks is similar.

At 201, the UE determines, or calculates, LLR values $llr_{in}$ corresponding to each bit of a transport block allocated to a current transmission.

At 202, the UE determines whether a narrow-band channel estimation (NBCE) or a wideband channel estimation (WBCE) is to be used. Additionally, the UE may determine the number of Physical Resource Block Groups (PRGs) used for channel estimation. In one embodiment, the UE may determine whether the number of PRGs used for channel estimation is less than 4. If, at 202, a WBCE is to be used and the number of PRGs used for channel estimation is greater than a predetermined number of PRGs, flow continues to 203 where the Rank, the MCS and SINR for the transport block are used by the UE to access and select a normalization factor q at 204 from a LUT0. If, for example, at 202 the number of PRGs used for channel estimation is greater than the predetermined number of PRGs, then the UE may directly use the Rank, MCS and SINR for the transport block to accessing and selecting a normalization factor q from the LUT0. Flow continues to 205 where the $llr_{out}$ for each bit of the transport block is calculated, or determined, by, for example, a symbol processor circuit using Eq. (1) based on the normalization factor q selected from the LUT0 at 204.

If, at 202, NBCE is to be used and if the size of the PRG is less than a threshold (i.e., PRG size<4), flow continues to 206 where UE determines whether the estimated delay spread is greater than a threshold A. In one embodiment, the threshold A may be 4000 ns for a very large estimated delay spread.

If so, flow continues to 207, where the UE determines whether the delay divided by the length of the cyclic prefix is greater than a first threshold B. In one embodiment, first threshold B may be 0.8.

If so, flow continues to 208, where the UE determines whether the estimated Doppler spread is greater than a first estimated Doppler spread threshold C. In one embodiment, the first estimated Doppler spread threshold C may be 200 Hz for a very large Doppler situation.

If so, flow continues to 209 where the Rank/MCS/SINR for the transport block are used by the UE to access and select a normalization factor q at 210 from a LUT1. Flow continues to 205 where the $llr_{out}$ for each bit of the transport block is determined by, for example, a symbol processor circuit using Eq. (1) based on the normalization factor q selected from the LUT1 at 210.

If, at 208, the UE determines that the estimated Doppler spread is less than or equal to than the first estimated Doppler spread threshold C, flow continues to 211 where the Rank/MCS/SINR for the transport block are used by the UE to access and select a normalization factor q at 212 from a LUT2. Flow continues to 205 where the $llr_{out}$ for each bit of the transport block is determined by, for example, a symbol processor circuit using Eq. (1) based on the normalization factor q selected from the LUT2 at 212.

If, at 207, the UE determines that the length of the cyclic prefix is less than or equal to the first cyclic prefix length threshold B , flow continues to 211 where the Rank/MCS/SINR for the transport block are used by the UE to access and select a normalization factor q at 212 from a LUT2. Flow continues to 205 where the $llr_{out}$ for each bit of the transport block is determined by, for example, a symbol processor circuit using Eq. (1) based on the normalization factor q selected from the LUT2 at 212.

If, at 206, the UE determines that the delay spread is less than or equal to the delay spread threshold A, flow continues to 213 where the UE determines whether the delay divided by the length of the cyclic prefix is greater than a second threshold B'. In one embodiment, the second threshold B' may be the same as the first threshold B, which in one embodiment is 0.8, but it should be understood that the second threshold B' may be different from the first threshold B.

If so, flow continues to 214, where the UE determines whether the estimated Doppler spread is greater than a second estimated Doppler spread threshold C'. In one embodiment, the second estimated Doppler spread threshold C' may be the same as the first estimated Doppler spread threshold C, which in one embodiment is 200 Hz, but it should be understood that the second estimated Doppler spread threshold C' may be different from the first estimated Doppler spread threshold C.

If so, flow continues to 215 where the Rank/MCS/SINR for the transport block are used by the UE to access and select a normalization factor q at 216 from a LUT3. Flow continues to 205 where the $llr_{out}$ for each bit of the transport block is determined by, for example, a symbol processor circuit using Eq. (1) based on the normalization factor q selected from the LUT3 at 216.

If, at 214, the UE determines that the estimated Doppler spread is less than or equal to than the second estimated Doppler spread threshold C', flow continues to 217 where the Rank/MCS/SINR for the transport block are used by the UE to access and select a normalization factor q at 218 from a LUT4. Flow continues to 205 where the $llr_{out}$ for each bit of the transport block is determined by, for example, a symbol processor circuit using Eq. (1) based on the normalization factor q selected from the LUT4 at 218.

If, at 213, the UE determines that the length of the cyclic prefix is less than or equal to than the second cyclic prefix length threshold B', flow continues to 217 where the Rank/MCS/SINR for the transport block are used by the UE to access and select a normalization factor q at 218 from a LUT4. Flow continues to 205 where the $llr_{out}$ for each bit of the transport block is determined by, for example, a symbol processing circuit using Eq. (1) based on the normalization factor q selected from the LUT4 at 218.

Table 1 sets forth example pseudocode corresponding to the flowchart of FIG. 2 for selecting a normalization factor q for an example of a Rank2 256 QAM according to the subject matter disclosed herein.

TABLE 1

Q-factor selection as function of Delay, CP length, Doppler spread.
Algorithm 1 Q-factor selection for Rank2 256 QAM

```
1:   procedure Select_q (Delay, Doppler, CP_length, SNR)
2:       if (Delay > Delay_Thr)
3:           Select LUT 4
4:       else
5:           if Delay/CP_length > ratio_thr
6:               if Doppler > Dopp_thr1
7:                   Select LUT 2
8:               else if Doppler > Dopp_thr2
9:                   Select LUT 1
10:              else
11:                  Select LUT 3
12:              end if
13:          else
14:              if Doppler > Dopp_th3
15:                  Select LUT 1
16:              else
17:                  Select LUT 0
18:              end if
19:          end if
20:      end if
21:      Return q
22:  end procedure
```

Table 2 sets forth example pseudocode for the LUTs based on an example SINR-based q value selection according to the subject matter disclosed herein.

TABLE 2

| Q-Table number | | Description |
|---|---|---|
| LUT 0 | 1: | if SNR > 14 |
|  | 2: | q = 1 |
|  | 3 | else |
|  | 4: | q = 2 |
|  | 5: | end if |
| LUT 1 | 1: | if SNR > 24 |
|  | 2: | q = −1 |
|  | 3: | else if 18 < SNR ≤ 24 |
|  | 4: | q = 0 |
|  | 5: | else |
|  | 6: | q = 1 |
|  | 7: | end if |
| LUT 2 | 1: | if SNR > 20 |
|  | 2: | q = −2 |
|  | 3: | else if 18 < SNR ≤ 20 |
|  | 4: | q = −1 |
|  | 5: | else |
|  | 6: | q = 0 |
|  | 7: | end if |
| LUT 3 | 1: | if SNR > 24 |
|  | 2: | q = 0 |
|  | 3: | else |
|  | 4: | q = 1 |
|  | 5: | end if |
| LUT 4 | 1: | if SNR > 20 |
|  | 2: | q = −3 |
|  | 3: | else |
|  | 4: | q = 0 |
|  | 5: | end if |

Figure 3:
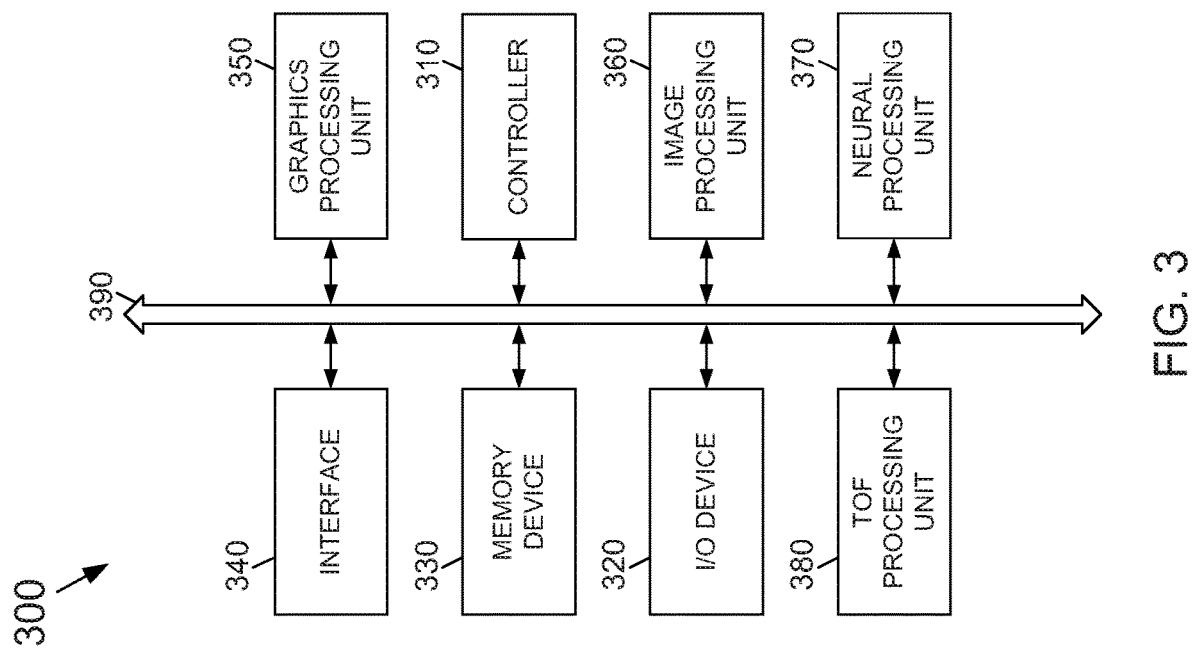
FIG. 3 depicts an electronic device that in one embodiment may include an interface that includes functionality for normalization of softbits based on transmission block parameters and channel characteristics according to the subject matter disclosed herein.

FIG. 3 depicts an electronic device 300 that in one embodiment may include an interface that includes functionality for normalization of softbits based on transmission block parameters and channel characteristics according to the subject matter disclosed herein. Electronic device 300 and the various system components of electronic device 300 may be formed from one or more modules. The electronic device 300 may include a controller (or CPU) 310, an input/output device 320 such as, but not limited to, a keypad, a keyboard, a display, a touch-screen display, a 2D image sensor, a 3D image sensor, a memory 330, an interface 340, a GPU 350, an imaging-processing unit 360, a neural processing unit 370, a TOF processing unit 380 that are coupled to each other through a bus 390. The controller 310 may include, for example, at least one microprocessor, at least one digital signal processor, at least one microcontroller, or the like. The memory 330 may be configured to store a command code to be used by the controller 310 and/or to store a user data.

The interface 340 may be configured to include a wireless interface that is configured to transmit data to or receive data from, for example, a wireless communication network using a RF signal. In one embodiment, the interface 340 includes functionality for normalization of softbits based on transmission block parameters and channel characteristics according to the subject matter disclosed herein. The wireless interface 340 may also include, for example, an antenna. The electronic system 300 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for normalizing Log-Likelihood Ratios (LLRs) for bits of a transport block, the method comprising:
   receiving, by a User Equipment (UE), the transport block over a channel of a wireless network;
   selecting, by the UE, a normalization factor q based, at least in part, on a narrowband channel estimation being used; and
   scaling, by the UE, an input $LLR_{in}$ for individual bits of the transport block to respectively form an output $LLR_{out}$ for the individual bits of the transport block by multiplying a corresponding input $LLR_{in}$ for the individual bits by $2^q$.

2. The method of claim 1, wherein the normalization factor q is selected further based on, at least in part, one of an estimated delay spread for the transport block, a cyclic prefix for the transport block, an estimated Doppler spread for the transport block, or a combination thereof.

3. The method of claim 2, wherein selecting the normalization factor q is further based, at least in part, on one of the estimated delay spread of the transport block being greater than a first predetermined threshold, the estimated delay spread divided by the cyclic prefix of the transport block being greater than a second predetermined threshold and the estimated Doppler spread of the transport block being greater than a third predetermined threshold, or a combination thereof.

4. The method of claim 2, wherein selecting the normalization factor q is further based, at least in part, on one of the estimated delay spread of the transport block being greater than a first predetermined threshold, and the estimated delay spread divided by the cyclic prefix of the transport block being less than a second predetermined threshold, or a combination thereof.

5. The method of claim 2, wherein selecting the normalization factor q is further based, at least in part, on one of the estimated delay spread of the transport block being less than a first predetermined threshold, the estimated delay spread divided by the cyclic prefix of the transport block being greater than a second predetermined threshold, and the estimated Doppler spread of the transport block being greater than a third predetermined threshold, or a combination thereof.

6. The method of claim 2, wherein selecting the normalization factor q is further based, at least in part, on one of the estimated delay spread of the transport block being less than a first predetermined threshold, and the estimated delay spread divided by the cyclic prefix of the transport block being less than a second predetermined threshold, or a combination thereof.

7. A method for normalizing Log-Likelihood Ratios (LLRs) for bits of a transport block, the method comprising:
receiving, by a User Equipment (UE), the transport block over a channel of a wireless network;
determining, by the UE, an input $LLR_{in}$, for individual bits of the transport block; and
respectively scaling, by the UE, a corresponding input $LLR_{in}$, for the individual bits of the transport block using a normalizing factor that is based, at least in part, on a narrowband channel estimation being used for estimating the channel.

8. The method of claim 7, wherein the normalizing factor is further based, at least in part, on one of an estimated delay spread of the transport block being greater than a first predetermined threshold, the estimated delay spread divided by a cyclic prefix of the transport block being greater than a second predetermined threshold and an estimated Doppler spread of the transport block being greater than a third predetermined threshold, or a combination thereof.

9. The method of claim 7, wherein the normalizing factor is further based, at least in part, on one of an estimated delay spread of the transport block being greater than a first predetermined threshold, and the estimated delay spread divided by a cyclic prefix of the transport block being less than or equal to a second predetermined threshold, or a combination thereof.

10. The method of claim 7, wherein the normalizing factor is further based, at least in part, on one of an estimated delay spread of the transport block being less than or equal to a first predetermined threshold, the estimated delay spread divided by a cyclic prefix of the transport block being greater than a fourth predetermined threshold, and an estimated Doppler spread of the transport block being greater than a fifth predetermined threshold, or a combination thereof.

11. The method of claim 7, wherein the normalizing factor is further based, at least in part, on one of an estimated delay spread of the transport block being less than or equal to a first predetermined threshold, and the estimated delay spread divided by a cyclic prefix of the transport block being less than or equal to a fifth predetermined threshold, or a combination thereof.

12. The method of claim 7, wherein the normalizing factor is further based, at least in part, on an estimated Doppler spread of the transport block being less than or equal to a fifth predetermined threshold.

13. A device, comprising:
a receiver configured to receive a transport block over a channel of a wireless network; and
a processor coupled to the receiver, the processor being configured to normalize Log-Likelihood Ratios (LLRs) for bits of the transport block by:
selecting a normalizing factor q based, at least in part, on a narrowband channel estimation being used, and one of an estimated delay spread for the transport block, a cyclic prefix for the transport block, an estimated Doppler spread for the transport block, or a combination thereof, and
scaling an input $LLR_{in}$ for individual bits of the transport block to respectively form an output $LLR_{out}$ for the individual bits of the transport block by multiplying a corresponding input $LLR_{in}$ for the individual bits by $2^q$.

14. The device of claim 13, wherein the processor is further configured to scale the input $LLR_{in}$ for individual bits of the transport block by multiplying an absolute value of the corresponding input $LLR_{in}$ for the individual bits by $2^q$, and
wherein the normalizing factor q is further based, at least in part, on a rank of associated with the transport block, a modulation and coding scheme of the transport block, a signal-to-noise ratio associated with the transport block, or a combination thereof.

15. The device of claim 13, wherein the processor is further configured to select the normalizing factor q further based, at least in part, on one of the estimated delay spread of the transport block being greater than a first predetermined threshold, the estimated delay spread divided by the cyclic prefix of the transport block being greater than a second predetermined threshold and the estimated Doppler spread of the transport block being greater than a third predetermined threshold, or a combination thereof.

16. The device of claim 13, wherein the processor is further configured to select the normalizing factor a based, at least in part, on one of the estimated delay spread of the transport block being greater than a first predetermined threshold, and the estimated delay spread divided by the cyclic prefix of the transport block being less than a second predetermined threshold, or a combination thereof.

17. The device of claim 13, wherein the processor is further configured to select the normalizing factor q based, at least in part, on one of the estimated delay spread of the transport block being less than a first predetermined threshold, the estimated delay spread divided by the cyclic prefix of the transport block being greater than a second predetermined threshold, and the estimated Doppler spread of the transport block being greater than a third predetermined threshold, or a combination thereof.

18. The device of claim 13, wherein the processor is further configured to select the normalizing factor q based, at least in part, on one of the estimated delay spread of the transport block being less than a first predetermined threshold, and the estimated delay spread divided by the cyclic prefix of the transport block being less than a second predetermined threshold, or a combination thereof.

* * * * *